(12) United States Patent
Nordmeyer (10) Patent No.: US 7,733,239 B2
(45) Date of Patent: Jun. 8, 2010

(54) DISTANCE DETERMINING SYSTEM AND METHOD

(75) Inventor: Daniel L. Nordmeyer, Indianapolis, IN (US)

(73) Assignee: BFS Diversified Products, LLC (US)

( * ) Notice: Subject to any disclaimer, the term of this patent is extended or adjusted under 35 U.S.C. 154(b) by 1066 days.

(21) Appl. No.: 11/382,247

(22) Filed: May 8, 2006

(65) Prior Publication Data

US 2007/0257833 A1      Nov. 8, 2007

(51) Int. Cl.
*G08C 19/00*     (2006.01)

(52) U.S. Cl. .......................... 340/825.72; 340/825.69; 455/88

(58) Field of Classification Search ............ 340/825.72, 340/825.69, 686.6; 455/88, 41.1–41.3
See application file for complete search history.

(56) References Cited

U.S. PATENT DOCUMENTS

| | | |
|---|---|---|
| 3,780,370 A | 12/1973 | Reeves |
| 3,859,624 A | 1/1975 | Kriofsky et al. |
| 4,041,490 A | 8/1977 | Watt et al. |
| 4,068,951 A | 1/1978 | Froome et al. |
| 4,072,946 A | 2/1978 | Kneefel |
| 4,183,022 A | 1/1980 | Baudard et al. |
| 4,278,977 A | 7/1981 | Nossen |
| 4,307,397 A | 12/1981 | Holscher |
| 4,621,705 A | 11/1986 | Etoh |
| 4,646,092 A | 2/1987 | Schreuder |
| 4,737,705 A | 4/1988 | Bitar et al. |
| 4,739,328 A | 4/1988 | Koelle et al. |
| 4,757,315 A | 7/1988 | Lichtenberg et al. |
| 4,798,369 A | 1/1989 | Geno et al. |
| 4,804,961 A | 2/1989 | Hane |
| 4,812,842 A * | 3/1989 | Bayerlein et al. ...... 340/825.72 |
| 4,817,922 A | 4/1989 | Hovance |
| 5,229,829 A | 7/1993 | Nihei et al. |
| 5,285,189 A | 2/1994 | Nowicki et al. |
| 5,298,904 A | 3/1994 | Olich |
| 5,337,137 A | 8/1994 | Ogawa et al. |
| 5,373,445 A | 12/1994 | Yopp |

(Continued)

FOREIGN PATENT DOCUMENTS

DE       34 23 602 A1    1/1986

(Continued)

OTHER PUBLICATIONS

Lee and Sorrells, "Passive RFID Basics," Microchip Technology Inc., 2001, pp. 1-7.

(Continued)

*Primary Examiner*—Nay A Maung
*Assistant Examiner*—Angelica M Perez
(74) *Attorney, Agent, or Firm*—Thomas R. Kingsbury; Matthew Dugan (57) ABSTRACT

A distance determining system includes a first transceiver and a second transceiver spaced a distance from the first transceiver and inductively coupled thereto. The first transceiver outputs a first electromagnetic wave. The second transceiver receives the first electromagnetic wave and outputs a second electromagnetic wave, which is received by the first transceiver. One of the first and second transceivers determines a distance therebetween based at least in part upon the elapsed time of travel of the first and second electromagnetic waves. An air spring assembly can include such a distance indicating system. A method of determining a distance is also included.

11 Claims, 5 Drawing Sheets

U.S. PATENT DOCUMENTS

| | | | |
|---|---|---|---|
| 5,500,065 A | 3/1996 | Koch et al. | |
| 5,521,497 A * | 5/1996 | Schneider et al. | 324/207.22 |
| 5,548,291 A | 8/1996 | Meier et al. | |
| 5,550,536 A | 8/1996 | Flaxl | |
| 5,552,789 A | 9/1996 | Schuermann | |
| 5,559,507 A | 9/1996 | Beigel | |
| 5,570,086 A | 10/1996 | Hanaoka et al. | |
| 5,589,821 A | 12/1996 | Sallen et al. | |
| 5,594,448 A | 1/1997 | d'Hont | |
| 5,619,207 A | 4/1997 | d'Hont | |
| 5,701,121 A | 12/1997 | Murdoch | |
| 5,707,045 A | 1/1998 | Easter | |
| 5,731,754 A | 3/1998 | Lee, Jr. et al. | |
| 5,801,372 A | 9/1998 | Yamaguchi | |
| 5,859,692 A | 1/1999 | Ross, Jr. et al. | |
| 5,936,161 A * | 8/1999 | Fischer | 73/632 |
| 6,036,179 A | 3/2000 | Rensel | |
| 6,073,491 A | 6/2000 | Fischer et al. | |
| 6,122,329 A | 9/2000 | Zai et al. | |
| 6,249,673 B1 | 6/2001 | Tsui | |
| 6,309,494 B1 | 10/2001 | Koch et al. | |
| 6,356,738 B1 | 3/2002 | Schneider et al. | |
| 6,414,626 B1 * | 7/2002 | Greef et al. | 342/127 |
| 6,469,590 B1 | 10/2002 | Lewis et al. | |
| 6,473,028 B1 | 10/2002 | Luc | |
| 6,474,380 B1 | 11/2002 | Rensel et al. | |
| 6,614,239 B2 | 9/2003 | Borghi | |
| 6,621,278 B2 | 9/2003 | Ariav | |
| 6,637,269 B2 * | 10/2003 | Reck et al. | 73/627 |
| 6,731,199 B1 | 5/2004 | Ueda | |
| 6,765,393 B2 | 7/2004 | Pierenkemper et al. | |
| 6,931,930 B2 * | 8/2005 | Reck | 73/597 |
| 6,963,301 B2 | 11/2005 | Schantz et al. | |
| 7,119,736 B2 | 10/2006 | Heide et al. | |
| 7,364,144 B2 * | 4/2008 | Nordmeyer | 267/64.27 |
| 7,420,462 B2 * | 9/2008 | Nordmeyer | 340/438 |
| 7,490,817 B2 * | 2/2009 | Nordmeyer | 267/64.27 |
| 7,532,110 B2 * | 5/2009 | Nordmeyer | 340/438 |
| 2002/0088517 A1 | 7/2002 | Shimura | |
| 2002/0180172 A1 | 12/2002 | Gottschalk et al. | |
| 2003/0090365 A1 | 5/2003 | Bergerhoff | |
| 2003/0150920 A1 | 8/2003 | Parks | |
| 2004/0118197 A1 | 6/2004 | Buist et al. | |
| 2004/0130442 A1 | 7/2004 | Breed et al. | |
| 2004/0203470 A1 | 10/2004 | Berliner et al. | |
| 2004/0257220 A1 | 12/2004 | Fischer et al. | |
| 2005/0253697 A1 | 11/2005 | Taguchi | |
| 2007/0013544 A1 * | 1/2007 | Chiu | 340/825.69 |

FOREIGN PATENT DOCUMENTS

| | | |
|---|---|---|
| DE | 197 01 053 C1 | 8/1998 |
| DE | 197 01 530 C1 | 8/1998 |
| EP | 1 522 431 A | 4/2005 |
| FR | 2 574 188 A1 | 6/1986 |
| GB | 2 177 475 A | 1/1987 |
| JP | 07 181254 A | 7/1995 |
| WO | WO 99/40704 A | 8/1999 |
| WO | WO 99/61936 A | 12/1999 |
| WO | WO 01/84518 A | 11/2001 |
| WO | WO 02/29435 A | 4/2002 |
| WO | WO 2006/073717 A | 7/2006 |

OTHER PUBLICATIONS

International Search Report; PCT/US2007/001532; dated Jun. 12, 2007; mailed Jun. 19, 2007.

* cited by examiner

DISTANCE DETERMINING SYSTEM AND METHOD

BACKGROUND

The present novel concept broadly relates to the art of distance measurement and, more particularly, to a system and method for determining a distance between associated structural members using electromagnetic carrier wave modulation and timing.

The subject system and method are amenable to broad use in a wide variety of applications and environments. One example of a suitable application is the use of the subject system and method on and with an associated fluid suspension member, such as an air spring of a vehicle, for example. The subject system and method will be discussed in detail hereinafter with specific reference to use on such an associated fluid suspension member. However, it is to be specifically understood that the subject system and method are capable of broader application and are not intended to be limited to this specific example of a suitable application.

A variety of well known and commonly used devices and arrangements have been and are currently used to monitor the relative position of one structural member to another. For example, mechanical linkage sensors that include one or more linkage members are often used to connect between adjacent structural members, such as a suspension component of a vehicle and a corresponding frame or body of the same. The linkage members typically act through a variable resistor or other suitable component that changes in response to the movement of the linkage. An electronic control unit (ECU) or other suitable device then determines the relative position of one structural member to the other based, for example, upon a corresponding change in voltage across the variable resistor or a corresponding change in current through the resistor.

Unfortunately, such arrangements have a number of problems and/or disadvantages that are commonly associated with their continued use. One problem with the use of mechanical linkages, particularly those used in association with the suspension system of a vehicle, is that the linkages are frequently subjected to physical impacts, such as may be caused by debris from a roadway, for example. This can result in the linkage being significantly damaged or broken, such that the device no longer operates properly, if it operates at all.

Another problem with mechanical linkage sensors is that the electronic components thereof are typically exposed to harsh environmental conditions (e.g., temperature extremes, water, dirt, salt) normally experienced by a vehicle traveling along a roadway. As a result of such exposure, the electronic components of the sensors can become corroded and fail to function properly. Due to one or both of these or other problems, one or more of the mechanical linkage sensors may be non-operational at any given time. Thus, regular inspection and replacement of such sensors is typically required.

Still another disadvantage of mechanical linkage sensors is that the same are mounted separately from the other suspension components. As a result, additional time and effort is typically spent installing these components during the assembly process. Furthermore, additional effort is typically involved in creating a clearance area for mounting and operation of the mechanical linkage. Thus, such sensors disadvantageously require a significant amount of effort and space for mounting and operation.

As an alternative to mechanical linkage sensors, non-contact sensors that utilize sound or pressure waves traveling through a fluid medium, typically at an ultrasonic frequency, have been used in determining the relative position of one structural member to another. One example of such an application includes an ultrasonic sensor being used to determine a height of a fluid suspension member, such as an air spring assembly, for example. In such a use, the ultrasonic sensor is supported on one end member of the air spring and sends ultrasonic waves through the spring chamber of the air spring toward the opposing end member. The waves are reflected back by a suitable feature of the opposing end member and the distance therebetween is determined in a conventional manner.

One advantage of such an arrangement over mechanical linkages is that the ultrasonic sensor is at least partially sheltered from impacts and exposure. However, numerous disadvantages also exist with the use of ultrasonic sensors. One such disadvantage is that such sensors are relatively expensive which tends to undesirably increase production costs. Also, the replacement cost of a sensor that does get damaged by an impact or from exposure is likewise increased.

Another disadvantage is that ultrasonic sensors require a target that is suitable to reflect the ultrasonic waves back to the sensor for determining the distance therebetween. If a such a target is not provided, the ultrasonic waves will not be reflected back properly and, thus, a correct determination of distance will not be possible. Thus, a target area must be provided for the proper operation of ultrasonic sensors. This can be particularly problematic, however, where the design constraints of a product limit the possibilities for including a target area. This is also a problem for existing products are being outfitted with ultrasonic sensors, where the existing products do not have a suitable target area.

BRIEF DESCRIPTION

A distance determining system in accordance with one exemplary embodiment of the present novel concept for use with an associated fluid spring assembly is provided that includes a first transceiver operative to output a first electromagnetic wave and receive a second electromagnetic wave. A second transceiver is spaced a distance from the first transceiver and is operative to receive the first electromagnetic wave and output the second electromagnetic wave. The first transceiver includes a timer operative to determine an elapsed time having a relation to the output of the first electromagnetic wave from the first transceiver and the receipt of the second electromagnetic wave at the first transceiver. The timer is operative to generate an elapsed time signal having a relation to the determined elapsed time.

A fluid spring assembly in accordance with one exemplary embodiment of the present novel concept is provided that includes a first end member, a second end member spaced from the first end member, and a flexible wall secured between the first and second end members and at least partially forming a spring chamber therebetween. A first transceiver is supported along the first end member and includes a timer. The first transceiver is adapted to output a first electromagnetic wave. A second transceiver is supported along the second end member and is adapted to receive the first electromagnetic wave and output the second electromagnetic wave. The first transceiver is adapted to receive the second electromagnetic wave. The timer is adapted to determine an elapsed time between the first transceiver outputting the first electromagnetic wave and the first transceiver receiving the second electromagnetic wave.

One exemplary method in accordance with the present novel concept of determining a distance having a relation to spaced end members of an associated fluid spring assembly is provided that includes providing a first transceiver supported along an associated first end member and including a timer. The first transceiver is operative to output a first electromagnetic wave and receive a second electromagnetic wave. The method also includes providing a second transceiver supported along an associated second end member. The second transceiver being operative to receive the first electromagnetic wave and output the second electromagnetic wave. The method further includes starting the timer, outputting the first electromagnetic wave from the first transceiver, and receiving the first electromagnetic wave at the second transceiver. The method also includes outputting the second electromagnetic wave from the second transceiver and receiving the second electromagnetic wave at the first transceiver. The method further includes stopping the timer and determining a elapsed time therefrom. The method also includes determining the distance based at least in part upon the elapsed time.

DETAILED DESCRIPTION

Figure 1:
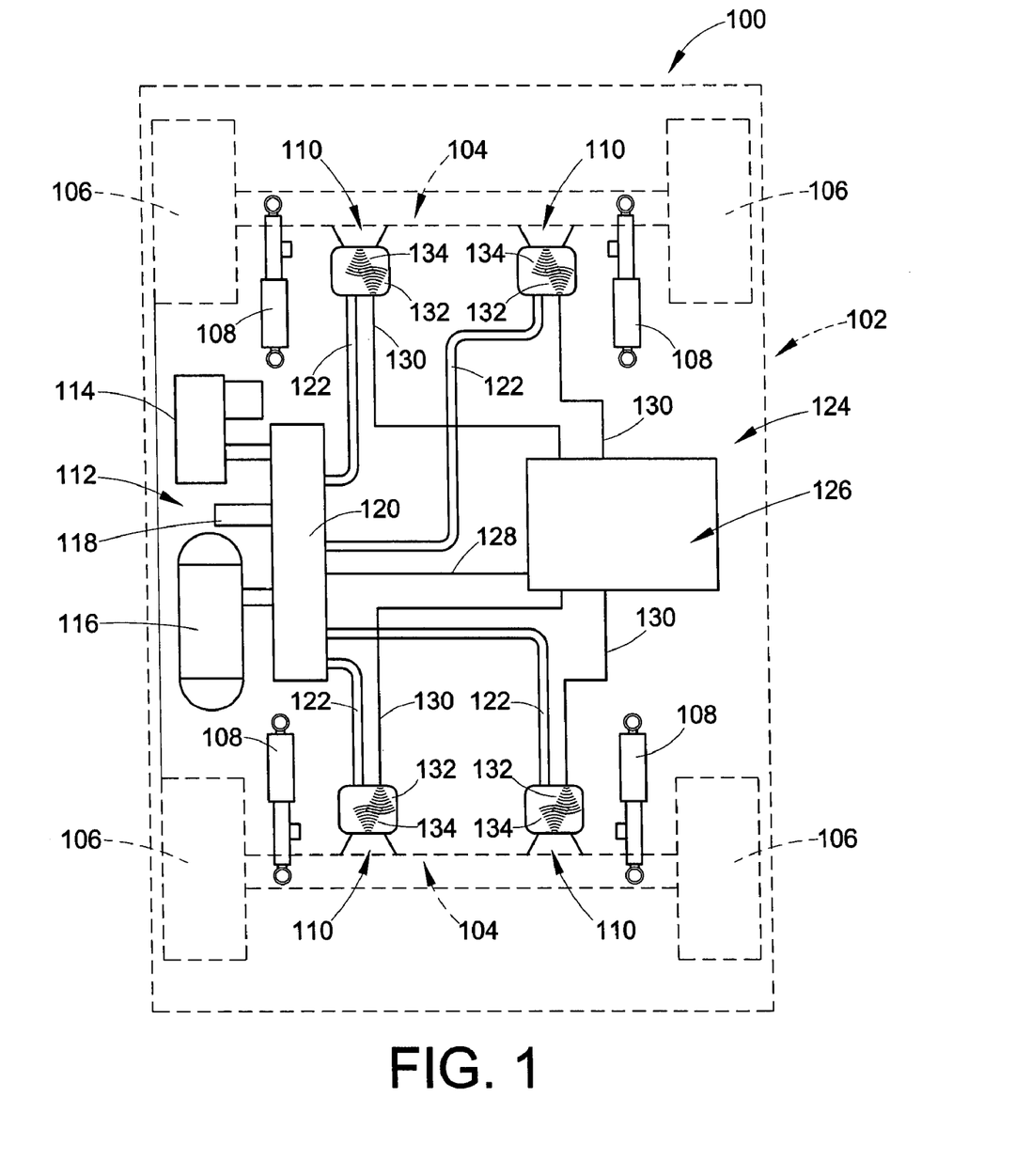
FIG. 1 is a representation of one exemplary embodiment of a distance determining system in accordance with the present novel concept shown in operative association on a vehicle.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and wheels 106, for example. A plurality of damping members, such as shock absorbers 108, for example, are secured between the sprung and unsprung masses of the vehicle in a suitable manner. Additionally, a plurality of fluid spring members, such as air spring assemblies 110, for example, are disposed between the sprung and unsprung masses of the vehicle, such as adjacent wheels 106 and shock absorbers 108 as shown in FIG. 1, for example.

Vehicle 100 also includes a fluid supply system 112 that is in communication with air spring assemblies 110 and is operative to selectively supply and exhaust pressurized fluid therefrom. Fluid supply system 112 includes a pressurized fluid source, such as a compressor 114, and can optionally include a storage vessel, such as reservoir 116, for example, for receiving and storing pressurized fluid from the pressurized fluid source. System 112 can further include a suitable fluid exhaust, such as a muffler 118, for example, for venting pressurized fluid from the system.

Fluid supply system 112 can be in communication with the fluid spring members in any suitable manner. For example, system 112 can include a valve assembly 120 or other suitable device or arrangement for selectively distributing pressurized fluid between the pressurized fluid source or sources and the fluid spring members. As shown in the exemplary embodiment in FIG. 1, compressor 114, reservoir 116 and muffler 118 are in fluid communication with valve assembly 120 and can be selectively placed in fluid communication with one another therethrough. Additionally, air spring assemblies 110 are in fluid communication with valve assembly 120 via fluid lines 122. Thus, valve assembly 120 can be selectively actuated to transfer pressurized fluid from the compressor and/or reservoir to one or more of the air spring assemblies. Additionally, valve assembly 120 can be selectively actuated to exhaust pressurized fluid from one or more of the air spring assemblies by way of muffler 118 or another suitable arrangement. It will be appreciated that the foregoing fluid supply system and operation thereof are merely exemplary and that any other suitable fluid source, system and/or method of operation can alternately be used.

Vehicle 100 also includes a suspension control system 124 for selectively operating, adjusting or otherwise influencing or controlling the performance or one or more suspension system components, such as shock absorbers 108, air spring assemblies 110 and/or pressurized fluid supply system 112, for example. Suspension control system 124 includes an electronic control unit 126 in communication with one or more components of valve assembly 120, such as through a communication line 128, for example, for selective actuation and/or operation thereof. Additionally, electronic control unit 126 is in communication with air spring assemblies 110 in a suitable manner, such as through communication lines 130, for example.

Suspension control systems, such as control system 124, for example, are operable in a wide variety of manners. For example, suspension control systems, such as control system 124, for example, can be used for height adjustment (i.e., to selectively raise or lower the sprung mass of a vehicle). As another example, suspension control systems, such as control system 124, for example, can be used for leveling operations (i.e., to maintain the sprung mass of a vehicle in a substantially level orientation). Given this common association with height monitoring and adjustment, suspension control systems typically utilize one or more height or distance sensors to monitor the vehicle height and/or orientation. A wide variety of height sensors and/or distance determining devices are known and commonly used, as discussed in one of the foregoing sections hereof. As an alternative to such known arrangements, air spring assemblies 110 include distance indicating or determining systems in accordance with the present novel concept that transmit electromagnetic waves 132 and 134 to determine and/or communicate a height of the vehicle or distance between two vehicle or suspension system components.

Figure 2:
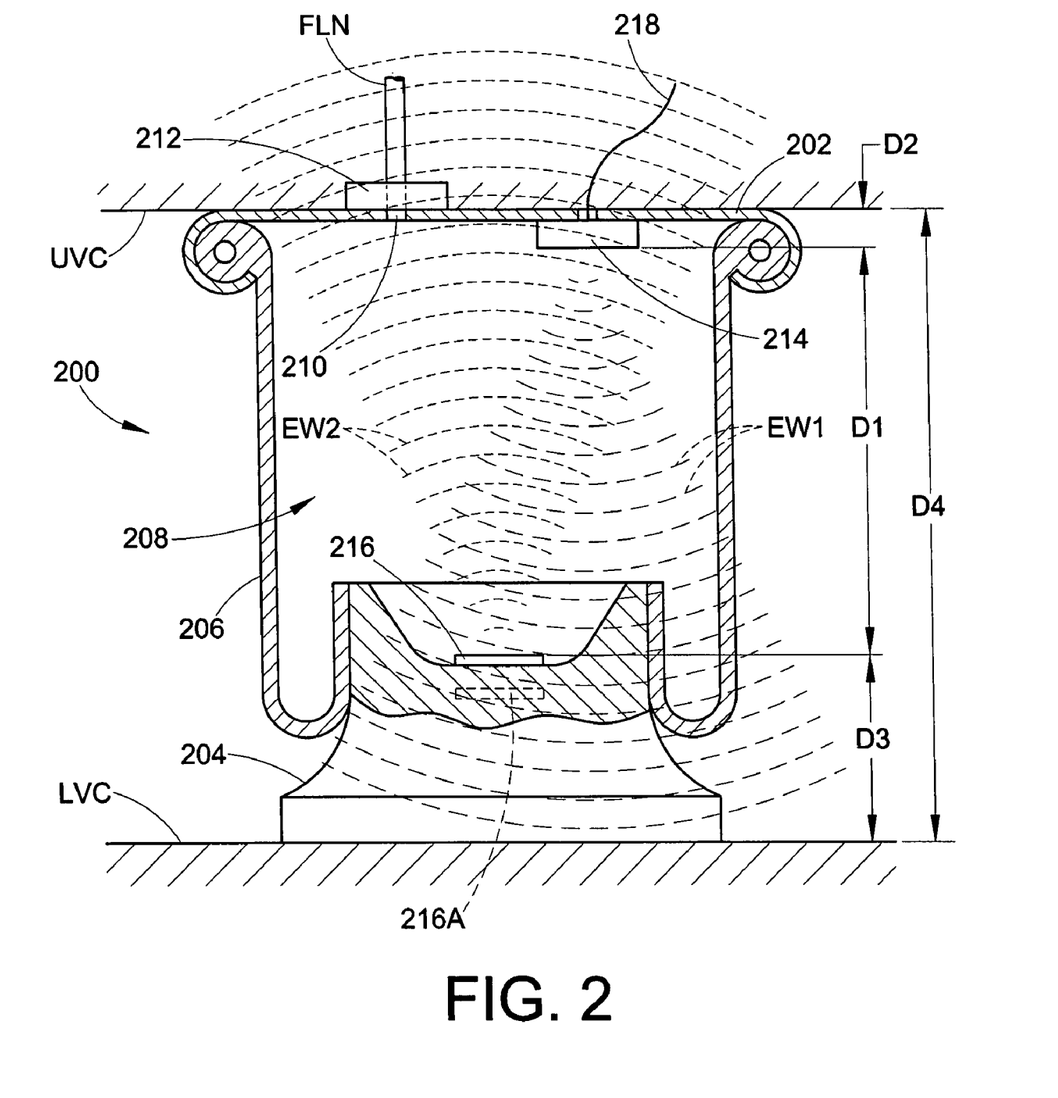
FIG. 2 is a side view, in partial cross section, of one exemplary embodiment of an air spring assembly including a distance indicating system in accordance with the present novel concept.

One exemplary embodiment of a fluid spring member in accordance with the present novel concept is shown in FIG. 2 as an air spring assembly 200 that includes a first or upper end member 202, a second or lower end member 204 and a flexible spring wall 206 secured therebetween. First or upper end member 202 is shown disposed along an associated upper vehicle component UVC and second or lower end member 204 is shown disposed along an associated lower vehicle component LVC. The upper and lower vehicle components could, for example, be parts of or associated with the respective sprung and unsprung masses of the vehicle. Additionally, it will be appreciated that the first and second end members can be respectively secured on the upper and lower vehicle components in any suitable manner, such as by using fasteners (not shown), for example. Furthermore, it will be appreciated that air spring assembly 200 is shown in FIG. 2 of a rolling-lobe construction. It is to be understood, however, that this construction is merely exemplary and that any other suitable type, style, kind, configuration and/or construction can alternately be used, such as an air spring assembly utilizing a convoluted bellows configuration, for example.

Flexible spring wall 206 at least partially defines a spring chamber 208 extending between end members 202 and 204. A suitable fluid line FLN, such as one of fluid lines 122 in FIG. 1, for example, is in communication with spring chamber 208 through an opening formed through one of the end members of the air spring assembly, such as through a passage 210 formed through first end member 202, for example. A suitable connector or fitting 212 can be used to maintain fluid line FLN in operative communication with spring chamber 208 through passage 210.

Air spring assembly 200 also includes a distance indicating system (not numbered) that includes a first transceiver 214 and a second transceiver 216 spaced a distance D1 from the first transceiver. First transceiver 214 can be in communication with one or more devices, components and/or systems in any suitable manner, such as through a conductive lead 218, for example. In one exemplary embodiment, conductive lead 218 can be representative of communication line 130 in FIG. 1 extending between an air spring assembly 110 and electronic control unit 126. Direct electrical communication can be made along and/or across conductive lead 218 or, alternately, communication signals, messages and/or other data or information can be transported to one or more devices, components and/or systems through lead 218 by way of a vehicle communication network or in another suitable manner. Additionally, electrical power can be supplied through lead 218 from an external power source (not shown), such as a battery or a vehicle alternator, for example. As shown in FIG. 2, however, second transceiver 216 is preferably wireless. Thus, communication to and from second transceiver 216 occurs using a first electromagnetic wave EW1 and a second electromagnetic wave EW2.

In the exemplary embodiment shown in FIG. 2, first transceiver 214 is supported on first end member 202 and second transceiver 216 is supported on second end member 204. The first and second transceivers can be secured on the end members in any suitable manner, such as by using suitable fasteners, adhesives, bracketry or by manufacturing a transceiver or component thereof into or onto the end member. For example, second transceiver 216 could be molded into end member 204 if formed from a polymeric material, as indicated by item number 216A. Additionally, it is to be understood that such an arrangement is merely exemplary and that any components of a distance indicating system in accordance with the present novel concept can be mounting in other positions, orientations and/or arrangements.

It will be recognized from FIG. 2 that the first and second transceivers can be used in a non-aligned orientation. That is, in the exemplary embodiment shown in FIG. 2, second transceiver 216 is disposed approximately centrally on the second end member whereas first transceiver 214 is disposed outwardly toward a peripheral edge of the first end member. However, any other suitable configuration or arrangement could alternately be used.

Furthermore, it will be appreciated that distance D2 between first transceiver 214 and first end member 202 and distance D3 between second transceiver 216 and second end member 204 will normally be fixed distances. As such, one of skill in the art will recognize that the distance between the transceivers, which is represented by dimension D1 in FIG. 2, can also be representative of the height of air spring assembly 200, as indicated by dimension D4, and that other dimensions or distances could be similarly determined.

Figure 3:
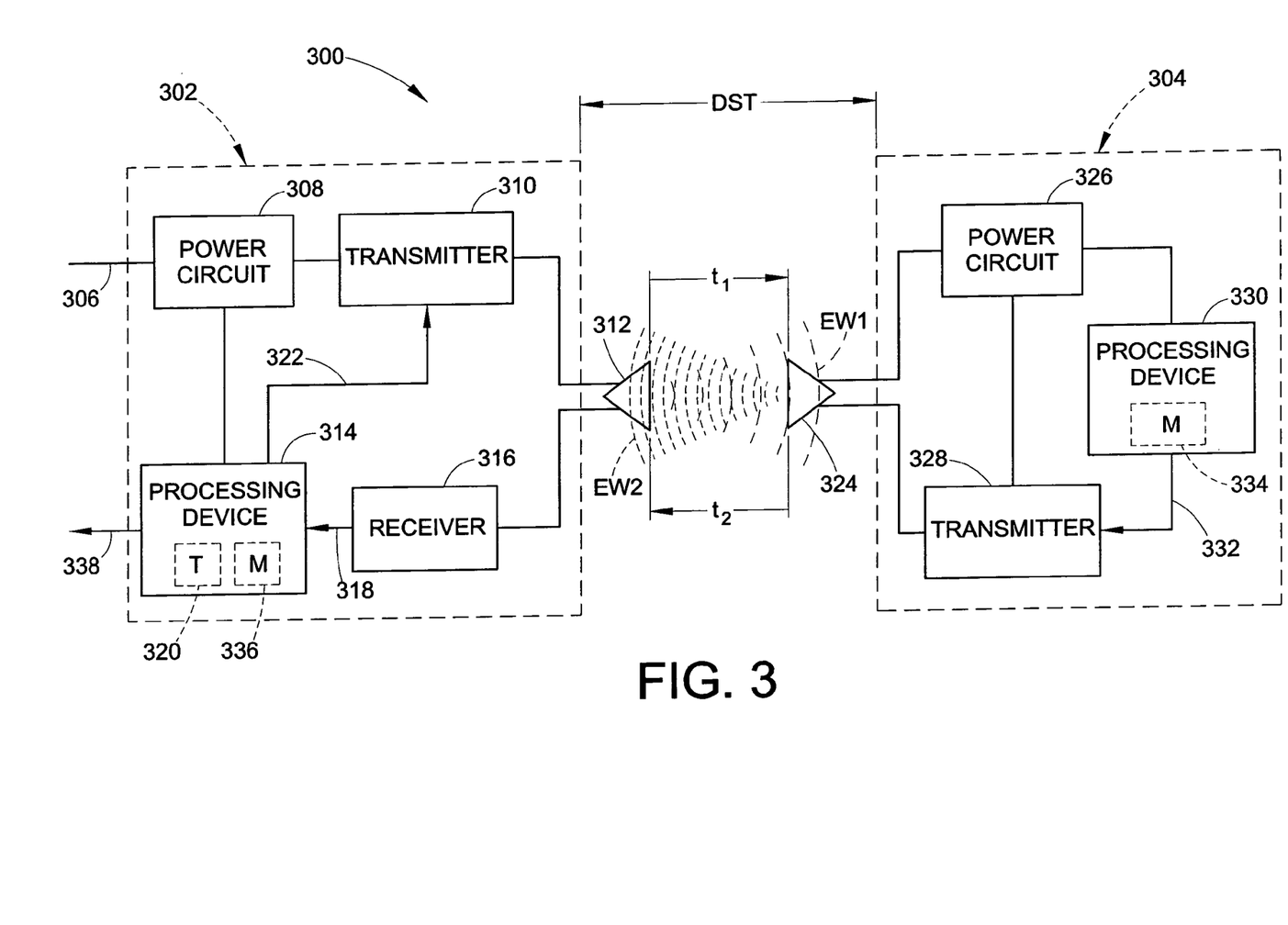
FIG. 3 is a schematic representation of one exemplary embodiment of a distance determining system in accordance with the present novel concept.

One exemplary embodiment of a distance indicating or determining system 300 is schematically illustrated in FIG. 3 and includes a first transceiver 302 and a second transceiver 304 spaced a distance DST, such as distance D1 or D4 in FIG. 2, for example, from the first transceiver. First transceiver 302 is in communication with a suitable external power source (not shown) through a suitable connection, such as a conductive lead 306, for example, for receiving suitably conditioned electrical power therefrom. It will be appreciated that the external power source can be any suitable AC or DC power source, such as a battery (vehicle or other), a generator or alternator, an electronic control unit, or a power control module, for example.

Alternately, first transceiver 302 can include a power circuit 308 in communication with conductive lead 306 for receiving relatively unconditioned electrical energy, such as from one of the above-mentioned electrical power sources, for example. Circuit 308 can output conditioned electrical power of appropriate voltages and/or current levels for use and operation of other components of first transceiver 302. It will be appreciated that circuit 308 can be formed as a part of a fully integrated circuit of first transceiver 302, as a separate circuit supported on first transceiver 302, or as a separate circuit or system on an entirely separate component from the first transceiver. Regardless of the construction, however, power circuit 308 is adapted to provide suitably conditioned and regulated electrical power from an external power source (not shown) to the components of the first transceiver.

First transceiver 302 also includes a first transmitter 310 and a first antenna 312 in communication with the first transmitter. First transmitter 310 can include a carrierwave generator (not shown) or other component or device suitable for and adapted to output an electrical carrier wave signal that is suitable for broadcast as an electromagnetic carrier wave by an associated antenna, such as first antenna 312, for example. In one exemplary embodiment, the first carrier wave signal output by transmitter 310 is a sine wave having a substantially constant amplitude and frequency. However, it is to be distinctly understood that any suitable electrical carrier wave signal can be used. It will be appreciated that the electrical carrier wave signal output by the generators can have any suitable voltage, such as from about 50 volts to about 100 volts, for example, and can have any suitable frequency, such as from about 10 kHz to about 30 MHz, for example. In one exemplary embodiment, the electrical signal has a frequency of about 125 kHz and an amplitude of about 100 volts, though such values can vary from application to application, as mentioned above.

In the exemplary embodiment shown, power supply circuit 308 is in communication with transmitter 310 as well as with a processing device 314. Additionally, first transceiver 302 also includes a receiver 316 in communication with first antenna 312 and processing device 314. Receiver 316 can be a device, component or system of any suitable type, kind or construction, such as a peak detector, for example. Transmitter 308 is operative to output a first carrier wave signal that is broadcast as a first electromagnetic wave EW1 from first antenna 312. In addition to broadcasting first electromagnetic wave EW1, first antenna 312 is also operative to receive a second electromagnetic wave EW2.

As discussed in additional detail hereinafter, receiver 316 is operative to recover a second carrier wave signal from second electromagnetic wave EW2 and generate an output signal therefrom. The output signal can be an analog signal that is communicated to another component, device and/or system. Optionally, an amplifier or other device can be included to amplify or otherwise condition the analog signal for further communication. Alternately, an analog-to-digital converter could optionally be used to convert the analog signal to a digital data stream or message. As another alternate arrangement, receiver 316 can output digital data, signals or messages, and the output signal in whatever form can be communicated to processing device 314 as indicated by arrow 318. The processing device can perform any suitable calculations, conversions, decoding and/or other analysis, and output any resulting output, such as values and/or messages, for example, to other downstream components, devices, systems and/or networks. For example, processing device 314 can communicate with a vehicle data bus, such as a CAN bus, SAE J1850 data bus, or other vehicle information systems and/or networks, for example.

Additionally, first transceiver 302 includes a suitable timing device, circuit or other arrangement. In the exemplary embodiment shown, first transceiver includes a timer indicated generally by item number 320, which can be a constructive timer formed by a clock or oscillator and a processor, for example. The timing device or circuit can be in communication with transmitter 308 in any suitable manner and operative to transmit or otherwise communicate one or more signals thereto. In the exemplary embodiment shown, timer 320 is established on processing device 314 using suitable hardware and/or software. As such, processing device 314 is shown as being in communication with transmitter 308 as indicated by arrow 322. One example of a suitable processing device is a micro-controller available from Freescale Semiconductor, Inc. of Austin, Tex. under the designation or part number 68HC05L25.

Second transceiver 304 includes a first antenna 324 adapted to receive first electromagnetic wave EW1 and broadcast second electromagnetic wave EW2. Additionally, first antenna 324 includes an inductive element (not shown) and electromagnetic wave EW1 induces an electrical output across or along this inductive element of antenna 324. The electrical output can include electrical potential and/or electrical current. Second transceiver 304 also includes a power circuit 326 in communication with antenna 324, and the power circuit collects or otherwise accumulates the electrical output from across or along the antenna 324 and periodically energizes second transceiver 304 using at least a portion of the collected or accumulated electrical energy. Alternately, some or all of the electrical energy demanded by second transceiver 304 could be provided by another electrical energy source, such as a battery, for example.

Second transceiver 304 also includes a transmitter 328 in communication with power circuit 326. Similar to first transmitter 310, transmitter 328 can include a carrier wave generator (not shown) or other component or device suitable for and adapted to output an electrical carrier wave signal that is suitable for broadcast as an electromagnetic carrier wave by an associated antenna, such as first antenna 324, for example. As such, transmitter 328 is operative to generate a second carrier wave signal suitable for broadcasting as the second electromagnetic wave. Transmitter 328 is in communication with first antenna 324, which receives the second carrier wave signal and broadcasts the same as second electromagnetic wave EW2. In one exemplary embodiment, the second carrier wave signal output by transmitter 328 is a sine wave having a substantially constant amplitude and frequency. However, it is to be distinctly understood that any suitable electrical carrier wave signal can be used. It will be appreciated that the electrical carrier wave signal output by the generators can have any suitable voltage, such as from about 50 volts to about 100 volts, for example, and can have any suitable frequency, such as from about 300 MHz to about 30 GHz, for example.

In one exemplary embodiment, the electrical signal has a frequency of about 2.2 GHz and an amplitude of about 100 volts, though such values can vary from application to application, as mentioned above.

It will be appreciated that a vehicle may include numerous electromagnetic devices operating and/or communicating using electromagnetic waves having approximately the same frequency. To minimize operational difficulties between such multiple components, distance determining system 300 can optionally include or otherwise operate using messages, signals, data and/or other communications, such as to minimize cross-talk between components and/or systems. One example of a suitable arrangement for generating such messages, signals, data and/or communications is shown in FIG. 3, in which second transceiver 304 includes an optional processing device 330 in communication with power circuit 326 and transmitter 328. Processing device 330 receives electrical energy from power circuit 326 and is operative to communicate a message, data or signal, whether encoded or unencoded, to transmitter 328 as indicated by arrow 332. In one exemplary embodiment, processing device 330 can include a memory 334, such as an integrated non-volatile memory, for example, suitable for storing data, information and/or other communications, such as at least one message, for example.

Figure 4:
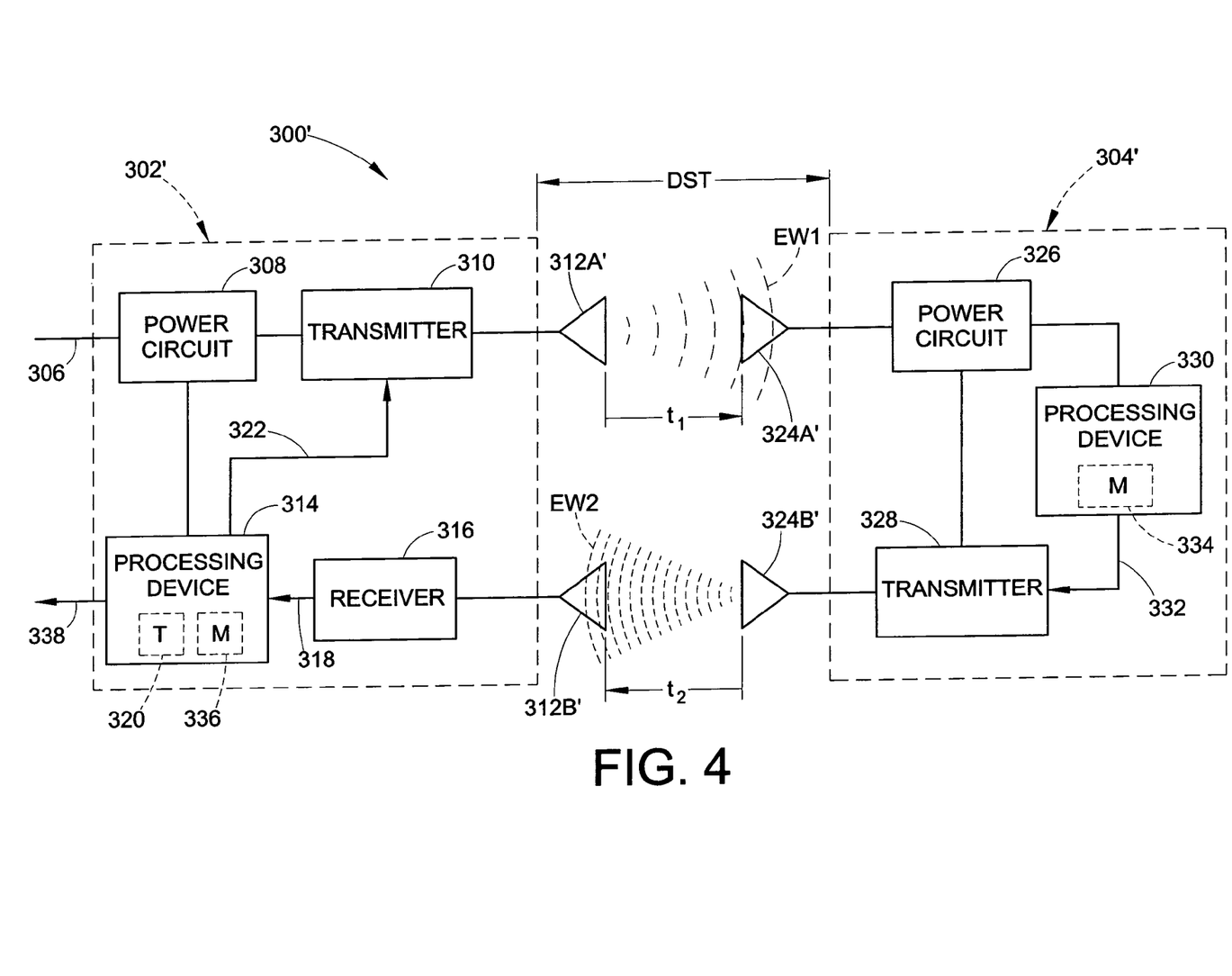
FIG. 4 is a schematic representation of another exemplary embodiment of a distance determining system in accordance with the present novel concept.

An alternate embodiment of distance indicating system 300 is shown in FIG. 4 as distance indicating system 300', which is substantially similar to distance indicating system 300. As such, like item numbers are used with reference to like items, and different or new items are identified by primed (') item numbers. Distance determining system 300' includes a first transceiver 302' adapted to output first electromagnetic wave EW1 and receive second electromagnetic wave EW2. First transceiver 302' is substantially similar to first transceiver 300 shown in FIG. 3. However, first transceiver 302' includes a first antenna 312A' for outputting first electromagnetic wave EW1 and a second antenna 312B' adapted to receive second electromagnetic wave EW2. Additionally, second transceiver 304' is substantially similar to second transceiver 304 shown in FIG. 3. However, second transceiver 304' includes a first antenna 324A' adapted to receive first electromagnetic wave EW1' and a second antenna 324B' adapted to output second electromagnetic wave EW2. As such, in one exemplary embodiment of distance indicating system 300', first electromagnetic wave EW1 transmitted from first antenna 312A' to first antenna 324A' is operative to power the second transceiver. However, no messages, data or other information are transmitted or otherwise communicated. Such communications (e.g., messages, data or other information) can be transmitted from second antenna 324B' to second antenna 312B', as discussed above.

Antennae 312 and 324, antennae 312A' and 324A', and antennae 312B' and 324B' can be of any suitable type, kind, construction and/or configuration. Additionally, any inductors or inductive components thereof can be of any suitable shape, size and/or arrangement. For example, inductors can be formed as a coil of wire that is in a square, circular or loop shape, for example. It will be appreciated that inductively coupled components can benefit from matched, tuned or otherwise optimized inductors and/or antennas. As such, one benefit of distance determining system 300' is that first antennas 310A' and 324A' can be matched or otherwise optimized for inductive communication, while second antennas 310B' and 324B' can be optimized for wave transmission.

The operation of distance determining system 300 (or 300') will now be described in detail. First transceiver 302 is powered from a suitable power source. Processing device 314 (or timer 320 thereof) sends a time-zero or start signal to transmitter 310, as indicated by arrow 322, to initiate a timing sequence. The transmitter then generates a first carrier wave signal and communicates the same to an antenna, such as antenna 312 or 312A', for example, which broadcasts the first carrier wave signal as first electromagnetic wave EW1.

After a first elapsed time $t_1$, the first electromagnetic wave is received by second transceiver 304, such as at or along antenna 324 or 324A' thereof, for example. In one exemplary embodiment, at least antenna 324 or 324A' includes an inductive component and the first electromagnetic wave is operative to induce electrical output along or across the antenna. Power circuit 326 is in communication with the antenna. The power circuit collects the electrical energy and eventually energizes transmitter 328 and processing device 330 for a brief period of time.

While energized, transmitter 328 generates a second carrier wave signal and communicates the second carrier wave signal to an antenna, such as antenna 324 or 324B', for example, which broadcasts the second carrier wave signal as a second electromagnetic wave EW2. Optionally, processing device 330, while energized, communicates a message, data or other information, whether encoded or unencoded, to transmitter 328, which incorporates the message, data or other information into the second carrier wave signal, which is then broadcast as discussed above.

After a second elapsed time $t_2$, the second electromagnetic wave is received by first transceiver 302, such as at or along antenna 312 or 312B', for example. Receiver 316 recovers the second carrier wave signal from the second electromagnetic wave, and communicates an output signal to processing device 314 (or timer 320), which can then stop the earlier initiated timing sequence. Optionally, a message, data or other information, whether encoded or unencoded, may be included in the recovered second carrier wave signal and/or the output signal from receiver 316. If included, processing device can optionally recover (e.g., decode) the message, data or other information and validate the same prior to stopping the timing sequence. If a valid message, data or other information is received, the timing sequence is stopped. If, however, an invalid message, data or other information is received, the timing sequence is not stopped and, therefore, continues until a valid message, data or other information is received. It will be appreciated that the validity of the message, data or other information can be determined in any suitable manner. For example, processing device 314 can optionally include a memory 336 storing a corresponding message, data or information, for example, and such corresponding message, data or information can be compared with that recovered from the second electromagnetic wave.

Once the timing sequence has been stopped, processing device 314 (or timer 320 thereof) can determine a total elapsed time between the initiation of the timing sequence and the stopping of the timing sequence. This total elapsed time will have a relation to the distance that each of the first and second electromagnetic waves traveled and, thus, the distance between the first and second transceiver. Approximate time constants, such as the approximate time required for powering the second transceiver, for example, can be subtracted from the total elapsed time to more closely approximate the time of flight of the first and second electromagnetic waves. Such approximate time constants could be determined based upon actual performance testing or expected values.

Processing device 314 can then determine an approximate value for the total or overall distance that the first and second electromagnetic waves traveled based upon the speed of the electromagnetic waves and the total elapsed time (with or without adjustment). By dividing the overall distance in half, the distance between the first and second transceivers can be approximately determined. Processing device 314 can then output a suitable distance value or signal to other devices, components, systems and/or networks, as indicated by arrow 338.

Figure 5:
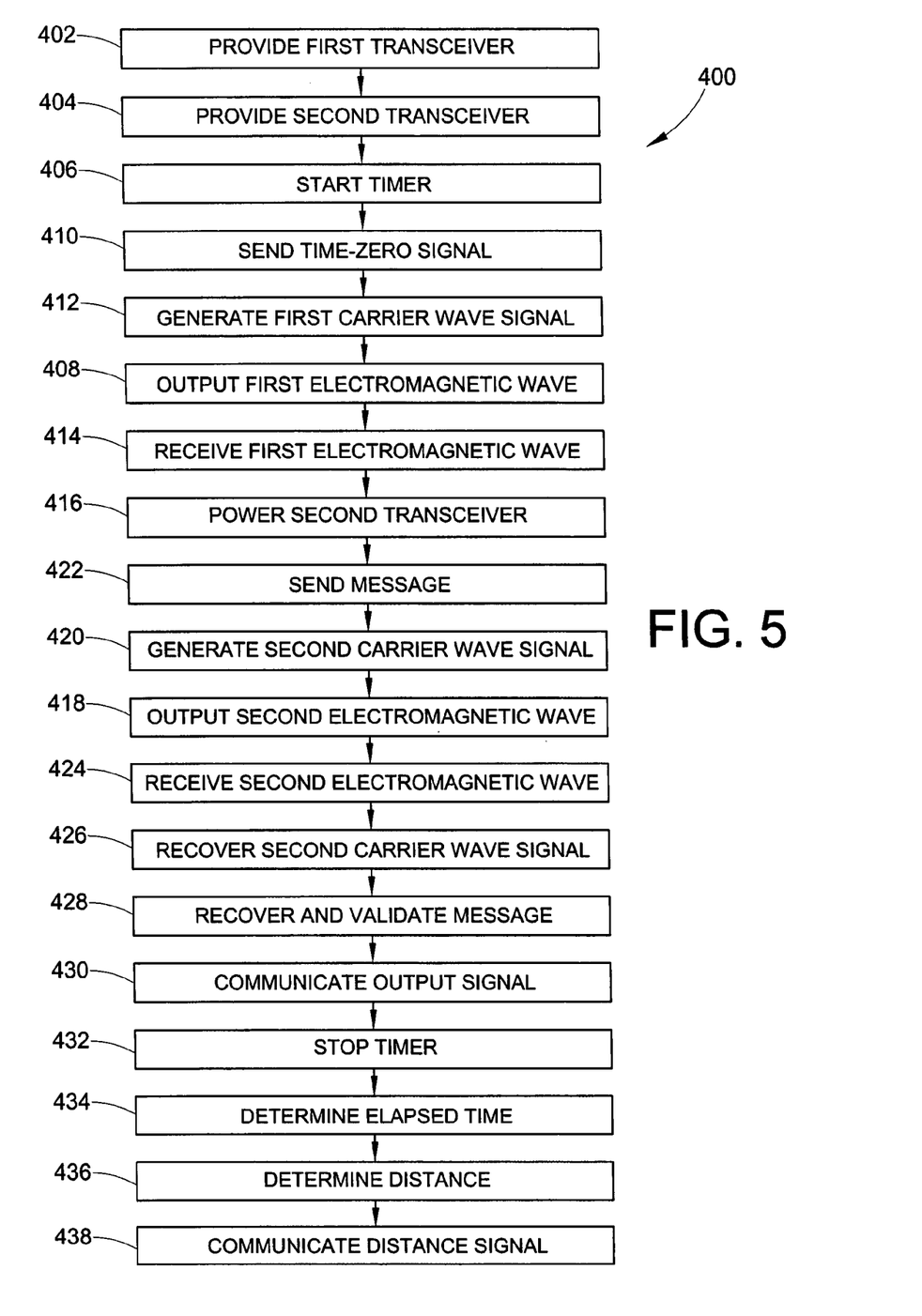
FIG. 5 is a diagrammatic representation of one exemplary method of determining a distance in accordance with the present novel concept.

Turning now to FIG. 5, a method 400 of determining a distance, such as a distance between spaced components of a fluid spring device, for example, includes providing a first transceiver, as indicated at box 402, and providing a second transceiver spaced from the first transceiver, as indicated by box 404. Method 400 also includes initiating a timing sequence, such as is as indicated in box 406, such as by starting a timer included on the first transceiver, for example. Method 400 further includes outputting a first electromagnetic wave, as indicated by box 408. It will be appreciated that the first electromagnetic wave can be generated in any suitable manner. For example, method 400 can optionally include sending a start or time-zero signal from the timer to a transmitter included on the first transceiver, as indicated by box 410, and then generating a first carrier wave signal suitable for broadcasting as the first electromagnetic wave, as indicated by box 412. Method 400 also includes receiving the first electromagnetic wave at or along the second transceiver, as indicated by box 414.

In one exemplary embodiment, the first and second transceivers are inductively coupled and, as such, the first electromagnetic wave is operative to induce electrical energy along or across an antenna of the second transceiver. As such, method 400 also includes powering the second transceiver using this induced electrical energy as indicated by box 416. Alternately, however, the second transceiver can include a power source, such as a battery, for example, operative to power the second transceiver. Method 400 further includes outputting a second electromagnetic wave using the second transceiver, as indicated by box 418. It will be appreciated that the second electromagnetic wave can be generated in any suitable manner. As such, the second transceiver can include a transmitter and method 400 can include generating a second carrier wave signal for broadcasting as the second electromagnetic wave, as indicated by box 420. Optionally, method 400 can include sending a message to the transmitter for incorporation into the second carrier wave signal, as indicated by box 422. As such, the second transceiver can optionally include data, information or other communications for encoding or communicating a signal or message from the second transceiver to the first transceiver.

Method 400 further includes receiving the second electromagnetic wave, such as at the first transceiver, for example, as indicated by box 424. The method also includes recovering the second carrier wave signal from the second electromagnetic wave, as indicated by box 426. If a message or other communication, whether encoded or unencoded, is provided such as in optional step 422, method 400 can optionally include recovering and validating such a message as indicated by box 428. Having recovered the second carrier wave signal and/or recovered and validated any optional message, method 400 can include communicating an output signal, such as from a receiver on the first transceiver to the timer, as indicated by box 430. Method 400 further includes stopping the timer, such as upon receiving the output signal, as indicated by box 432. The method also includes determining an elapsed time, as indicated by box 434, and determining a distance based at least in part upon the elapsed time, as indicated by box 436. Method 400 can also include communicating a distance signal corresponding to the determined distance to at least one of an external device, an external system or an external network, as indicated by box 438.

While the subject novel concept has been described with reference to the foregoing embodiments and considerable emphasis has been placed herein on the structures, structural interrelationships and other interactions between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A fluid spring assembly comprising:
    a first end member;
    a second end member spaced a distance from said first end member;
    a flexible wall secured between said first and second end members and at least partially forming a spring chamber therebetween;
    a first transceiver supported along said first end member and including a timer, said first transceiver adapted to output a first electromagnetic wave; and,
    a second transceiver supported along said second end member and adapted to receive said first electromagnetic wave and output a second electromagnetic wave;
    said first transceiver adapted to receive said second electromagnetic wave, and said timer adapted to determine an elapsed time between said first transceiver outputting said first electromagnetic wave and said first transceiver receiving said second electromagnetic wave.

2. A fluid spring assembly according to claim 1, wherein said timer is adapted to generate an elapsed time signal having a relation to said elapsed time, and said first transceiver includes a processing device in communication with said timer, said processing device adapted for receiving said elapsed time signal and determining said distance based at least in part upon said elapsed time signal.

3. A fluid spring assembly according to claim 2, wherein said first transceiver includes a transmitter adapted to generate a first carrier wave and an antenna in communication with said transmitter, said antenna adapted to broadcast said first carrier wave as said first electromagnetic wave.

4. A fluid spring assembly according to claim 3, wherein said processing device is in communication with said transmitter and communicates a time-zero signal to said transmitter for initiating said first carrier wave and broadcasting said first electromagnetic wave.

5. A fluid spring assembly according to claim 4, wherein said second transceiver includes a memory storing at least a first message, and said second transceiver is adapted to communicate said first message to said first transceiver using said second electromagnetic wave.

6. A fluid spring assembly according to claim 5, wherein said second transceiver includes an antenna, a transmitter in communication with said antenna and operative to generate a carrier wave signal including said first message for broadcasting as said second electromagnetic wave, and a processing device in communication with said memory and said transmitter and adapted to communicate said first message from said memory to said transmitter.

7. A method of determining a distance having a relation to spaced end members of an associated fluid spring assembly, said method comprising:
    a) providing a first transceiver supported along an associated first end member and including a timer, said first transceiver operative to output a first electromagnetic wave and receive a second electromagnetic wave;
    b) providing a second transceiver supported along an associated second end member, said second transceiver inductively coupled to said first transceiver and operative to receive said first electromagnetic wave and output said second electromagnetic wave;
    c) starting said timer;
    d) outputting said first electromagnetic wave from said first transceiver;
    e) receiving said first electromagnetic wave at said second transceiver;
    f) outputting said second electromagnetic wave from said second transceiver;
    g) receiving said second electromagnetic wave at said first transceiver;
    h) stopping said timer and determining an elapsed time therefrom; and,
    i) determining said distance based at least in part upon said elapsed time.

8. A method according to claim 7 further comprising transmitting a message along with said second electromagnetic wave from said second transceiver to said first transceiver and recovering said message from said second electromagnetic wave.

9. A method according to claim 8 further comprising determining if said message is valid prior to performing h).

10. A method according to claim 7 further comprising communicating said distance to at least one of an external device, an external system or an external network.

11. A method according to claim 7 further comprising inducing electrical energy in said second transceiver using said inductive coupling and selectively discharging said electrical energy to power said second transceiver.

* * * * *